(12) United States Patent
Fan et al.

(10) Patent No.: US 9,857,636 B2
(45) Date of Patent: Jan. 2, 2018

(54) DISPLAY SUBSTRATE AND LIQUID CRYSTAL DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yuguang Fan, Beijing (CN); Jian Li, Beijing (CN); Jing Han, Beijing (CN); Shichao Wang, Beijing (CN); Jingpeng Li, Beijing (CN); Yifeng Qin, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/140,193

(22) Filed: Apr. 27, 2016

(65) Prior Publication Data
US 2017/0075156 A1 Mar. 16, 2017

(30) Foreign Application Priority Data
Sep. 11, 2015 (CN) .......................... 2015 1 0578965

(51) Int. Cl.
*G02F 1/1339* (2006.01)
(52) U.S. Cl.
CPC .................... *G02F 1/13394* (2013.01); *G02F 2001/13396* (2013.01); *G02F 2001/13398* (2013.01)
(58) Field of Classification Search
CPC ........................................... G02F 2001/13396
(Continued)

(56) References Cited

U.S. PATENT DOCUMENTS

2007/0002262 A1  1/2007  Kawabe
2009/0207371 A1* 8/2009  Yamamoto .......... G02F 1/13394
                                                    349/156
(Continued)

FOREIGN PATENT DOCUMENTS

CN         1892317        1/2007
CN       103257482        8/2013
(Continued)

OTHER PUBLICATIONS

Office action from corresponding Chinese Application No. 201510578965.3, dated Jun. 30, 2017, 7 pages.

*Primary Examiner* — Wen-Ying P Chen
(74) *Attorney, Agent, or Firm* — Harness, Dickey & Pierce, P.L.C.

(57) ABSTRACT

Embodiments of the present disclosure relate to the display technical field, and disclose a display substrate and a liquid crystal display device, which will improve the pressure resistant performance of the liquid crystal display device, while not substantially reducing the LC margin of the liquid crystal display device. The display substrate comprises a base substrate and spacers disposed on the base substrate; the spacers at least comprise main spacers, auxiliary spacers and first sub-spacers; the plurality of main spacers encircle to form a repeating unit, in which a plurality of the auxiliary spacers are arranged in an array, and at least one first sub-spacer is distributed in a center region of the repeating unit; wherein the vertical distances from the top of the main spacers, the top of the first sub-spacers, the top of the auxiliary spacers to the base substrate decrease sequentially.

11 Claims, 3 Drawing Sheets

(58) Field of Classification Search
USPC .................................................. 349/156, 157
See application file for complete search history.

(56) References Cited

U.S. PATENT DOCUMENTS

2015/0293393 A1   10/2015   Kim et al.
2016/0291374 A1   10/2016   Fan et al.

FOREIGN PATENT DOCUMENTS

CN   103472628   12/2013
CN   204462601    7/2015

\* cited by examiner

DISPLAY SUBSTRATE AND LIQUID CRYSTAL DISPLAY DEVICE

CROSS-REFERENCE TO RELATED APPLICATION

This application claims the benefit and priority of Chinese Patent Application 201510578965.3 filed Sep. 11, 2015. The entire disclosure of the above application is incorporated herein by reference.

FIELD

The present disclosure relates to the display technical field, more particularly, to a display substrate and a liquid crystal display device.

BACKGROUND

This section provides background information related to the present disclosure which is not necessarily prior art.

A liquid crystal display device comprises: a color film substrate and an array substrate disposed opposite to each other, a liquid crystal molecule layer disposed between the two, and spacers for supporting between the two. Specifically, the spacers comprise main spacers and auxiliary spacers, wherein the main spacers are for maintaining the space between the color film substrate and the array substrate, and the auxiliary spacers are for making the liquid crystal display device resume rapidly after it is affected by external forces. Improper design of the spacers will make the supporting strength of the spacers not enough, causing poor pressure resistant performance of the liquid crystal display device, wherein the pressure resistant performance includes occurrence of water ripples and polishing resistance performance, etc. For example, if the supporting strength of the spacers is not sufficient, then when the liquid crystal display device is extruded by an external force, a considerable deformation will occur at the extrusion position of the liquid crystal display device, so as to cause the liquid crystal molecules to flow at the extrusion position and the liquid crystal display device to produce water ripples.

In the prior art, the supporting strength of the spacers is enhanced mainly by increasing the density of the main spacers (the number of main spacers within a unit area), and thus the pressure resistant performance of the liquid crystal display device is improved. However, the inventor of the present application found that increasing the density of the main spacers will substantially reduce the liquid crystal margin (LC margin) of the liquid crystal display device, rendering the LC margin of the liquid crystal display device too small, i.e., the scope of the amount of the liquid crystal molecules that need to be dripped in the liquid crystal display device is too narrow.

SUMMARY

This section provides a general summary of the disclosure, and is not a comprehensive disclosure of its full scope or all of its features.

An object of the present disclosure is to provide a display substrate and a liquid crystal display device, for improving the pressure resistant performance of the liquid crystal display device, while not substantially reducing the LC margin of the liquid crystal display device.

In order to achieve the above object, embodiments of the present application provide a display substrate and adopt the following technical solutions:

A display substrate, on which are disposed spacers, the spacers comprising at least main spacers, auxiliary spacers and first sub-spacers, a plurality of the main spacers encircle to form a repeating unit, a plurality of the auxiliary spacers are arranged in an array in the repeating unit, and at least one of the first sub-spacer is distributed in a center region of the repeating unit, wherein the vertical distances from the top of the main spacers, the top of the first sub-spacers, and the top of the auxiliary spacers to the base substrate decrease sequentially.

Embodiments of the present disclosure provide a display substrate having the above structure. Since a plurality of the main spacers encircle to form a repeating unit, a plurality of the auxiliary spacers are arranged in an array in the repeating unit, and at least one first sub-spacer is distributed in a center region of the repeating unit, and since the vertical distance from the top of the first sub-spacers to the base substrate is greater than the vertical distance from the top of the auxiliary spacers to the base substrate, the disposing of the first sub-spacers can enhance the supporting strength of the spacers, so as to effectively improve the pressure resistant performance of the liquid crystal display device. In addition, since the vertical distance from the top of the first sub-spacers to the base substrate is smaller than the vertical distance from the top of the main spacers to the base substrate, the space required for disposing a first sub-spacer is smaller than the space required for disposing a main spacer; thus, compared with the manner of improving the density of the main spacers, disposing of the first sub-spacers will not substantially reduce the LC margin of the liquid crystal display device.

Embodiments of the present disclosure further provide a liquid crystal display device, which comprises the above-mentioned display substrate.

Since the liquid crystal display device comprises the above-mentioned display substrate, the liquid crystal display device has the same advantageous effects as those of the above-mentioned display substrate, which are not repeated herein.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

Figure 1:
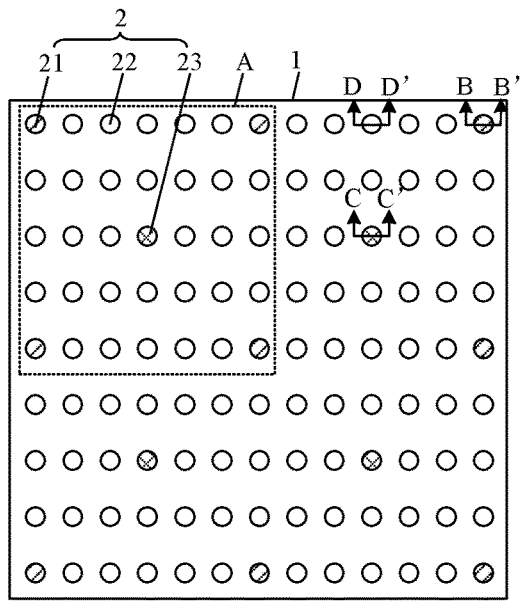
FIG. 1 is a first schematic view of a display substrate in an embodiment of the present disclosure.
Figure 2:
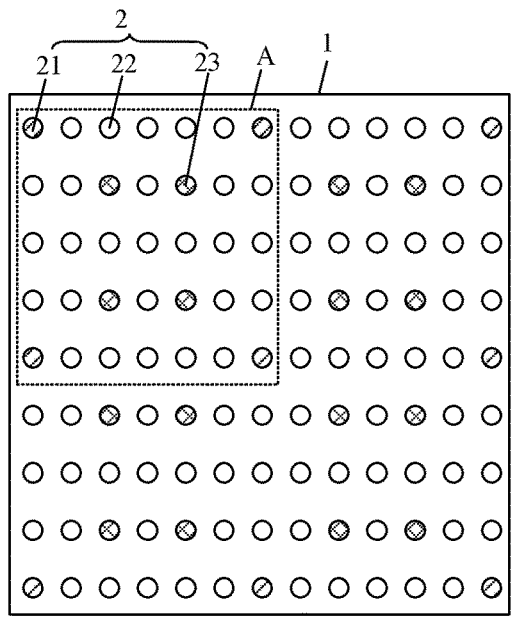
FIG. 2 is a second schematic view of a display substrate in an embodiment of the present disclosure.
Figure 3:
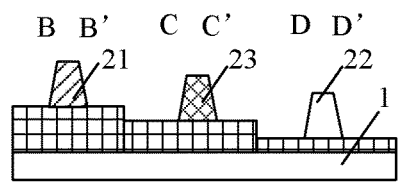
FIG. 3 is a first cross sectional view at B-B', C-C', and D-D' in FIG. 1 of an embodiment of the present disclosure.
Figure 4:
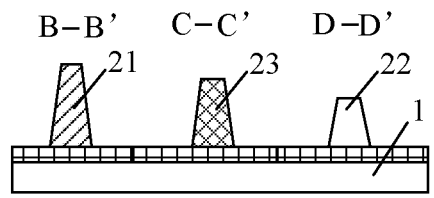
FIG. 4 is a second cross sectional view at B-B', C-C', and D-D' in FIG. 1 of an embodiment of the present disclosure.

Embodiments of the present disclosure provide a display substrate; as shown in FIGS. 1 and 2, the display substrate comprises base substrate 1 and spacers 2 disposed on the base substrate 1. Specifically, the spacers 2 at least comprises main spacers 21, auxiliary spacers 22 and first sub-spacers 23, a plurality of the main spacers 21 encircle to form a repeating unit A, in which a plurality of the auxiliary spacers 22 are arranged in an array, and at least one first sub-spacer 23 is distributed in a center region of the repeating unit A. As shown in FIGS. 3 and 4, the vertical distances from the top of the main spacers 21, the top of the first sub-spacers 23, the top of the auxiliary spacers 22 to the base substrate 1 decrease sequentially. When a plurality of first sub-spacers 23 are distributed in the center region of the repeating unit A, preferably, the plurality of first sub-spacers 23 are evenly distributed in the center region of the repeating unit A.

For example, the fact of "the plurality of first sub-spacers 23 are evenly distributed in the center region of the repeating unit A" as mentioned above may comprise the following two specific implementations:

Implementation one: as shown in FIG. 1, four main spacers 21 encircle to form a rectangular repeating unit A, in which a plurality of auxiliary spacers 22 are arranged in an array; moreover, one first sub-spacer 23 is disposed in the rectangular repeating unit A, and the first sub-spacer 23 is at the center of the rectangular repeating unit A.

Implementation two: as shown in FIG. 2, four main spacers 21 encircle to form a rectangular repeating unit A, in which a plurality of auxiliary spacers 22 are arranged in an array; and four first sub-spacers 23 are disposed in a center region of the rectangular repeating unit A, and the four first sub-spacers 23 encircle to form a rectangle with the center of the repeating unit A as its center.

It should be noted that in the embodiments of the present disclosure, the fact of "the plurality of first sub-spacers 23 are evenly distributed in the center region of the repeating unit A" may further comprise other specific implementations. For example, four main spacers 21 encircle to form a rectangular repeating unit A, in which a plurality of auxiliary spacers 22 are disposed in an array, and a plurality of first sub-spacers 23 encircle to form a circle in a center region of the rectangular repeating unit A. Those skilled in the art may select an implementation according to actual needs, which is not repeated in the description of embodiments of the present disclosure Further, in a preferred embodiment of the present disclosure, the elastic modulus of the first sub-spacers 23 is greater than the elastic modulus of the main spacers 21, so that the first sub-spacers 23 have a greater supporting strength than that of the main spacers 21, thus further enhancing the supporting strength of the spacers 2 and further improving the pressure resistant performance of the liquid crystal display.

In addition, it should be noted that in embodiments of the present disclosure, the fact of "the vertical distances from the top of the main spacers 21, the top of the first sub-spacers 23, the top of the auxiliary spacers 22 to the base substrate 1 decrease sequentially" may also comprise a plurality of specific implementations. An exemplary embodiment of the present disclosure provides the following specific implementations, and those skilled in the art may obtain other possible implementations according to actual needs, which are not repeated in the description of embodiments of the present disclosure.

Implementation one: as shown in FIG. 3, the heights of the main spacers 21, the auxiliary spacers 22 and the first sub-spacers 23 are the same; the vertical distances from the bottom of the main spacers 21, the bottom of the first sub-spacers 23 and the bottom of the auxiliary spacers 22 to the base substrate 1 decrease sequentially, so that the vertical distances from the top of the main spacers 21, the top of the first sub-spacer 23 and the top of the auxiliary spacers 22 to the base substrate 1 decrease sequentially.

Implementation two: as shown in FIG. 4, the vertical distances from the bottom of the main spacers 21, the bottom of the first sub-spacers 23 and the bottom of the auxiliary spacers 22 to the base substrate 1 are the same, and the heights of the main spacers 21, the first sub-spacers 23 and the auxiliary spacers 22 decrease sequentially, so that the vertical distances from the top of the main spacers 21, the top of the first sub-spacers 23 and the top of the auxiliary spacers 22 to the base substrate 1 decrease sequentially.

"The vertical distance from the bottom of the main spacers 21 to the base substrate 1" in the above implementation one and implementation two may refer to "the total thickness of the film layers between the main spacers 21 and the base substrate 1"; similarly, "the vertical distance from the bottom of the first sub-spacers 23 to the base substrate 1" may refer to "the total thickness of the film layers between the first sub-spacers 23 and the base substrate 1"; and "the vertical distance from the bottom of the auxiliary spacers 22 to the base substrate 1" may refer to "the total thickness of the film layers between the auxiliary spacers 22 and the base substrate 1".

Embodiments of the present disclosure provide a display substrate with the above structure; since a plurality of main spacers 21 encircle to form a repeating unit A, in which a plurality of auxiliary spacers 22 are arranged in an array, and at least one first sub-spacer 23 is distributed in a center region of the repeating unit A, and since the vertical distance from the top of the first sub-spacers 23 to the base substrate 1 is greater than the vertical distance from the top of the auxiliary spacers 22 to the base substrate 1, the disposition of the first sub-spacers 23 can improve the supporting strength of the spacers 2, so as to effectively enhance the pressure resistant performance of the liquid crystal display device. In addition, since the vertical distance from the top of the first sub-spacers 23 to the base substrate 1 is smaller than the vertical distance from the top of the main spacers 21 to the base substrate 1, the space required for disposing one first sub-spacer is smaller than the space required for disposing one main spacer; thus, compared with the manner of improving the density of the main spacers, the disposing of the first sub-spacers will not substantially reduce the LC margin of the liquid crystal display device.

Figure 5:
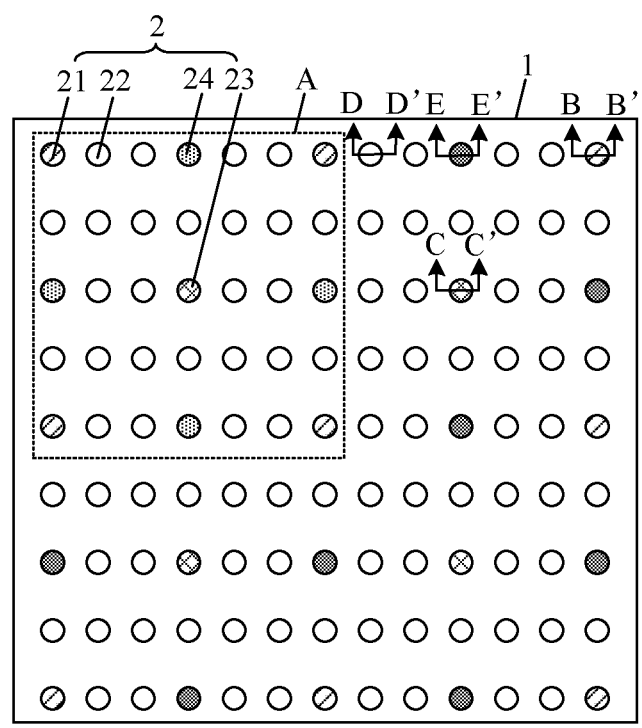
FIG. 5 is a third schematic three of a display substrate in an embodiment of the present disclosure.
Figure 6:
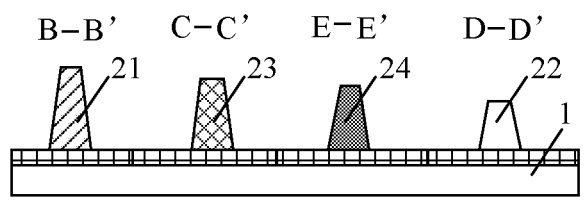
FIG. 6 is a cross sectional view at B-B', C-C', and D-D' in FIG. 5 of an embodiment of the present disclosure.

In addition, as shown in FIG. 5, the spacers 2 in an embodiment of the present disclosure may further include second sub-spacers 24, and a plurality of second sub-spacers 24 are evenly distributed around each of the first sub-spacers 23; wherein, as shown in FIG. 6, the vertical distances from the top of the main spacers 21, the top of the first sub-spacers 23, the top of the second sub-spacers 24 and the top of the auxiliary spacers 22 to the base substrate 1 decrease sequentially, and thus the vertical distance from the top of the second sub-spacers 24 to the base substrate 1 is greater than the vertical distance from the top of the auxiliary spacers 22 to the base substrate 1, so that disposing of the second sub-spacers 24 may further enhance the supporting strength of the spacers 2, thus further improving the pressure resistant performance of the liquid crystal display device.

In an exemplary embodiment of the present disclosure, as shown in FIG. 5, four main spacers 21 encircle to form a rectangular repeating unit A, in which a plurality of auxiliary spacers 22 are arranged in an array, and one first sub-spacer 23 and four second sub-spacers 24 are disposed in the rectangular repeating unit A, wherein the first sub-spacer 23 is at the center of the rectangular repeating unit A, and each of the second sub-spacers 24 is at the center of one edge of the rectangular repeating unit A.

It should be noted that the above fact of "a plurality of second sub-spacers 24 are evenly distributed around each of the first sub-spacers 23" may comprise other specific implementations. Those skilled in the art may obtain other possible implementations according to actual needs, which are not repeated in the description of embodiments of the present disclosure.

Further, in a preferred embodiment of the present disclosure, the elastic modulus of the first sub-spacers 23 and the elastic modulus of the second sub-spacers 24 are both greater than the elastic modulus of the main spacers 21, thus both of the first sub-spacers 23 and the second sub-spacers 24 have stronger supporting strength than the main spacers 21, so that the supporting strength of the spacers 2 is further enhanced, and the pressure resistant performance of the liquid crystal display device is further improved.

In an embodiment of the present application, the above fact of "the vertical distances from the top of the main spacers 21, the top of the first sub-spacers 23, the top of the second sub-spacers 24 and the top of the auxiliary spacers 22 to the base substrate 1 decrease sequentially" may also comprise a plurality of specific implementations, for which, reference may be made to the specific implementations of the fact of "the vertical distances from the top of the main spacers 21, the top of the first sub-spacers 23 and the top of the auxiliary spacers 22 to the base substrate 1 decrease sequentially" as described above, and which is not repeated in the description of embodiments of the present disclosure.

It should be added that although the above contents only state the technical solution in which the spacers 2 comprises main spacers 21, auxiliary spacers 22 and one kind of sub-spacers (first sub-spacers 23) or two kinds of sub-spacers (first sub-spacers 23 and second sub-spacers 24), those skilled in the art may reasonably design as to how many kinds of sub-spacers are to be included in spacers 2 according to specific conditions. For example, those skilled in the art may reasonably design as to how many sub-spacers are to be included in spacers 2 according to specific conditions such as the thickness of the liquid crystal cells formed by cell-assembling the display substrate and another substrate, or the difference between the vertical distances from the top of the main spacers 21 and the top of the auxiliary spacers 22 to the base substrate 1, or the difficulty of the manufacturing process. The inventor of the present application has found that on precondition of not changing the difference of the vertical distances from the top of the main spacers and the top of the auxiliary spacers to the base substrate in the prior art, it is preferable that spacers 2 includes one to three kinds of sub-spacers; and after considering comprehensively the difficulty of the manufacturing process, the effect of improving the pressure resistant performance of the liquid crystal display, and the LC margin of the liquid crystal display device, further embodiments of the present disclosure prefer the technical solution in which spacers 2 include main spacers 21, auxiliary spacers 22 and first sub-spacers 23, or the technical solution in which spacers 2 include main spacers 21, auxiliary spacers 22, first sub-spacers 23 and second sub-spacers 24.

In addition, the inventor of the present application has further found that if the difference between the vertical distance from the top of the first sub-spacers 23 to the base substrate 1 and the vertical distance from the top of the main spacers 21 to the base substrate 1 is too large, the affect of disposing the first sub-spacers 23 on the supporting strength of the spacers 2 will not be great; and if the difference between the vertical distance from the top of the first sub-spacers 23 to the base substrate 1 and the vertical distance from the top of the main spacers 21 to the base substrate 1 is too small, disposing the first sub-spacers 23 will substantially reduce the LC margin of the liquid crystal display device; thus, it is necessary to have a proper difference between the vertical distance from the top of the first sub-spacers 23 to the base substrate 1 and the vertical distance from the top of the main spacers 21 to the base substrate 1. An exemplary embodiment of the present disclosure selects that the difference between the vertical distance from the top of the first sub-spacers 23 to base substrate 1 and the vertical distance from the top of the main spacers 21 to the base substrate 1 is 0.1 µm~0.2 µm.

Figure 7:
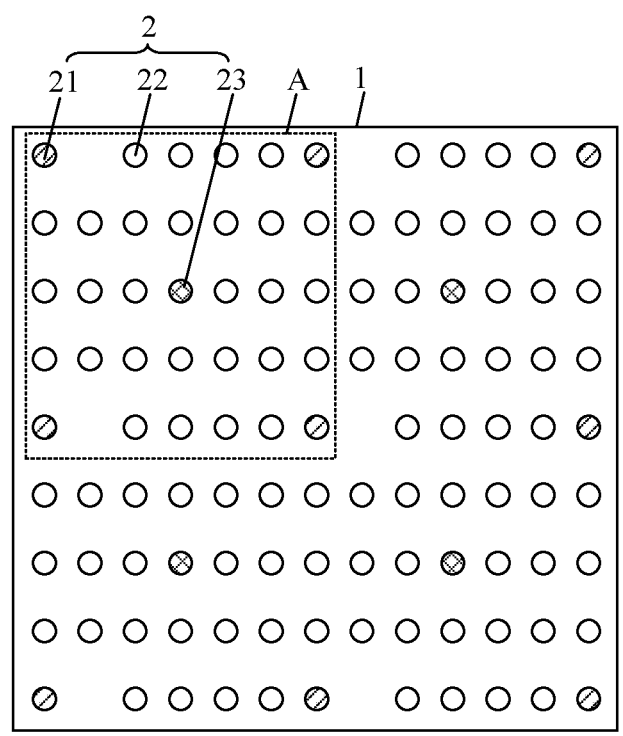
FIG. 7 is a fourth schematic view of a display substrate in an embodiment of the present disclosure.

In addition, although the vertical distance from the top of the main spacers 21 to the base substrate 1 is the greatest, since the size of the top of the main spacers 21 is close to the size of the top of other spacers, when the display substrate is viewed from above, the spacers 21 cannot be distinguished intuitively and accurately; thus, in a preferred embodiment of the present disclosure, as shown in FIG. 7, around each main spacer 21 there is a vacancy with no spacer disposed thereon, and when the display substrate is viewed from above, the vacancy can be observed intuitively and accurately, and so the main spacer 21 can be distinguished intuitively and accurately through the vacancy, which is convenient for subsequent processes.

The display substrate in embodiments of the present disclosure may be an array substrate, or a color film substrate. For example, when the display substrate is an array substrate, the display substrate may further comprise gate lines and gates, a gate insulating layer and an active layer disposed on the same layer on the base substrate 1, and data lines, sources and drains, a passivation layer and pixel electrodes disposed on the same layer, wherein the gate lines and the data lines may be disposed crisscross with each other, and the gate lines and the data lines define a plurality of sub-pixels, in which case, the spacers 2 may be disposed on the passivation layer at opaque positions. For example, when the display substrate is a color film substrate, the display substrate may further comprise a black matrix disposed on the base substrate 1, and the black matrix may encircle to form a plurality of sub-pixels, each of which is provided with a color filter layer, in which case, the spacers 2 may be disposed on the black matrix.

In addition, embodiments of the present disclosure further provide a liquid crystal display device, which comprises the above-mentioned display substrate.

Since the liquid crystal display device comprises the above-mentioned display substrate, the liquid crystal display device has the same advantageous effects as the above display substrate, which are not repeated herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A display substrate, comprising:
   a base substrate; and
   spacers disposed on the base substrate, wherein:
   the spacers comprise at least main spacers, auxiliary spacers and first sub-spacers;
   a plurality of the main spacers encircle to form a repeating unit, in which a plurality of the auxiliary spacers are arranged in an array, and at least one of the first sub-spacers is distributed in a center region of the repeating unit;
   vertical distances from a top of the main spacers to the base substrate, from a top of the first sub-spacers to the base substrate, and from a top of the auxiliary spacers to the base substrate, decrease sequentially; and
   an elastic modulus of the first sub-spacers is greater than an elastic modulus of the main spacers.

2. The display substrate of claim 1, wherein the plurality of main spacers includes four main spacers that encircle to form the rectangular repeating unit, in which the at least one first sub-spacer is disposed, and the at least one first sub-spacer is at the centre of the rectangular repeating unit.

3. The display substrate of claim 1, wherein:
   the spacers further comprise second sub-spacers;
   the vertical distances from the top of the main spacers to the base substrate, from the top of the first sub-spacers to the base substrate, from a top of the second sub-spacers to the base substrate, and from the top of the auxiliary spacers to the base substrate, decrease sequentially; and
   a plurality of the second sub-spacers are evenly distributed around each of the first sub-spacers.

4. The display substrate of claim 3, wherein:
   four of the plurality of the main spacers encircle to form the rectangular repeating unit, in which the at least one first sub-spacer and four of the second sub-spacers are disposed;
   the first sub-spacers are at the center of the rectangular repeating unit; and
   each of the second sub-spacers is at a center of one edge of the rectangular repeating unit.

5. The display substrate of claim 3, wherein an elastic modulus of the second sub-spacers is greater than the elastic modulus of the main spacers.

6. The display substrate of claim 4, wherein an elastic modulus of the second sub-spacers is greater than the elastic modulus of the main spacers.

7. A liquid crystal display device, comprising the display substrate of claim 3.

8. The display substrate of claim 1, wherein a difference between the vertical distance from the top of the first sub-spacers to the base substrate and the vertical distance from the top of the main spacers to the base substrate is 0.1 µm~0.2 µm.

9. The display substrate of claim 1, wherein around each main spacer there is a vacancy with no spacer disposed thereon.

10. The display substrate of claim 1, wherein:
    heights of the main spacers, the auxiliary spacers and the first sub-spacers are the same, and vertical distances from the bottom of the main spacers to the base substrate, from a bottom of the first sub-spacers to the base substrate, and from a bottom of the auxiliary spacers to the base substrate, decrease sequentially; or
    the vertical distances from the bottom of the main spacers to the base substrate, from the bottom of the first sub-spacers to the base substrate, and from the bottom of the auxiliary spacers to the base substrate, are the same, and the heights of the main spacers, the first sub-spacers and the auxiliary spacers decrease sequentially.

11. A liquid crystal display device, comprising the display substrate of claim 1.

* * * * *